United States Patent

Kurfürst

[11] Patent Number: 4,905,525
[45] Date of Patent: Mar. 6, 1990

[54] METHOD FOR DISPENSING A MICROGRAM OR MILLIGRAM SAMPLE FROM A POWDER OR PASTE AND DEVICE FOR ITS CARRYING OUT

[76] Inventor: Ulrich H. Kurfürst, Am Schönenhof 21, 6401 Kalbach 1, Fed. Rep. of Germany

[21] Appl. No.: 141,274

[22] Filed: Jan. 6, 1988

[30] Foreign Application Priority Data

Jan. 7, 1987 [DE] Fed. Rep. of Germany ....... 3700259

[51] Int. Cl.⁴ .............................................. B01L 3/02
[52] U.S. Cl. .................................................. 73/864.01
[58] Field of Search ............... 73/863, 864, 864.01, 73/864.13, 864.21, 864.81, 863.81; 222/386, 160, 181, 168.5; 422/64

[56] References Cited

U.S. PATENT DOCUMENTS

| | | |
|---|---|---|
| 2,590,900 | 4/1952 | Sommerstein . |
| 4,186,187 | 1/1980 | Jahnsen et al. .................... 422/64 |
| 4,188,986 | 2/1980 | Wetterlin et al. .................. 422/64 |
| 4,221,306 | 9/1980 | Althoff ............................. 222/200 |
| 4,270,675 | 6/1981 | Wilks et al. ...................... 222/196 |
| 4,463,875 | 8/1984 | Tepic ................................ 222/82 |
| 4,479,720 | 10/1984 | Mochida et al. .................. 422/64 |
| 4,542,835 | 9/1985 | Gamberini ....................... 222/168.5 |

FOREIGN PATENT DOCUMENTS

| | | |
|---|---|---|
| 0454891 | 3/1949 | Canada ............................. 222/181 |
| 2310663 | 10/1974 | Fed. Rep. of Germany . |
| 2945646 | 5/1981 | Fed. Rep. of Germany . |
| 3312841 | 11/1983 | Fed. Rep. of Germany . |
| 3204873 | 6/1985 | Fed. Rep. of Germany . |
| 2648330 | 1/1986 | Fed. Rep. of Germany . |
| 0207154 | 2/1984 | German Democratic Rep. ................................ 73/864.13 |

Primary Examiner—Robert R. Raevis
Attorney, Agent, or Firm—Wegner and Bretschneider

[57] ABSTRACT

In a magazine (1) that has an outlet (2) at the end of a forming channel (13) for dispensing a sample which is to be analyzed for example by atomic absorption spectrometry, a pusher (3) projects from above into the pulverized sample material (5) which is in the magazine (1). A small sample quantity is pressed out of the forming channel (13) and ejected through the outlet (2) by pressing the pusher (3) into the sample material (5) so that the sample material (5) is pressed into the forming channel (13) above the outlet (2) and then a small quantity in the micro- or milligram range is ejected.

14 Claims, 3 Drawing Sheets

METHOD FOR DISPENSING A MICROGRAM OR MILLIGRAM SAMPLE FROM A POWDER OR PASTE AND DEVICE FOR ITS CARRYING OUT

BACKGROUND OF THE INVENTION

The invention relates to a method for dispensing a microgram or milligram sample of determined quantity from a powder or paste stored in a magazine through an outlet of that magazine. Furthermore, the invention relates to a device for the carrying out of such a method.

Solid samples in the microgram and the low milligram range are necessary, for instance, for the tracer analysis of food by means of an atomic absorption spectrometer. Pulverized solid samples of such a small volume do not behave like samples in the gram range, for which, for example in the pharmaceutical industry, metering devices exist which work satisfactorily. The differences in the physical behaviour of smaller samples are, first and foremost, a result of electrostatic charge, size and distribution of the particles, adhesion effects and humidity of the samples. All these features are very important for the metering of minimum quantities and make the known methods unsuitable.

DE-PS 32 04 873 already discloses a device for the automatic loading of a graphite tube furnace of an atomic absorption spectrometer with a sample. The sample material is metered out of a magazine by shaking or vibrating onto a sample carrier, the magazine having an outlet at its base. In practice, sample material of different samples is of different constitution. Therefore it is impossible to dispense sample material quantities by shaking or vibrating, which are sufficiently constant in their weight. Due to the physical behavior of the sample material the other metering devices known in chemical engineering do not render it possible to dispense automatically the extremely small sample quantities.

Due to these shortcomings of the device according to the mentioned German patent 32 04 873, in practice the samples, the quanity of which is determined by eye, are manually taken from a magazine on the sample carriers by means of a spatula, the quantity of which is determined by eye. This has the disadvantage that, apart from the fact that an automatic operation is impossible, sample material can be carried over by means of the spatula from one sample material magazine to the other.

The same risk exists with the metering device according to DE-PS 29 45 646. By means of this device a determined volume can be dispensed, but there is the risk that a part of the metered material falls from the device when transported to the sample carrier and that a small quantity adheres to the device instead of reaching the sample carrier. Furthermore, in consequence of different densities, the masses can be different in spite of same volumes.

SUMMARY OF THE INVENTION

It is an object of the invention to improve a method of the kind mentioned at the beginning in such a manner that sample material quantities which are sufficiently constant can be dispensed automatically in a simple way. According to another aspect of the invention, there are devices provided for the carrying out of this method.

This first-mentioned object is accomplished according to the invention by the fact that the sample material to be dispensed is formed in the magazine to a column and separated from the remaining sample material by means of a pusher moving into the magazine and that then a sample body of determined length and thus mass and quantity is ejected from the magazine by further depressing the pusher.

This forming of the sample material according to the invention renders it possible to dispense an extremely exact sample material quantity by ejecting a sample material body of definite length due to a definite travel length of the pusher. Because of this it is easy to dispense samples so that use with an automatic handling device is possible. According to the invented method, the stored sample material can always remain in the magazine. Thus, there is not risk of contamination of the samples. Different sample materials are stored in different magazines which each have their own pusher, so that a carrying over of the sample material from one sample to another is impossible.

In practice, an especially simple method was tested, with which a pipette tip is used as magazine and the pusher is moved in the magazine to the outlet in order to form and eject the sample body. The pusher reaching into the outlet closes the magazine after the ejection of a sample body so that no sample material can get out of the magazine unintentionally.

The formation of cylindrical cavities within the sample material rendering it impossible to release approximately the same sample quantity repeatedly can be prevented in a simple way if the pusher is inserted into the magazine at an angle to the outlet and a relative motion is caused between the magazine and the pusher after each ejection of a sample. In this way sample material slips into the cavity formed after the ejection of a sample.

The second-mentioned object, providing a device for the carrying out of the method mentioned above, is established according to the invention by providing a pusher in the magazine for forming, separating and ejecting the sample body, this pusher being movable towards the outlet. By means of this pusher, a part of the quantity of the sample material can be pressed in the magazine, formed to a body in the form of a column and ejected through the outlet by a piston-like motion, rotation, vibration or oscillation. By varying the stroke of the pusher, this quantity can be changed, therefore it is adjustable.

The magazine can be closed by the pusher when the pusher is moved down to the outside of the outlet.

Sample bodies are formed more easily when the outlet is provided at the end of a forming channel that is in alignment with the pusher and which forms a part of the magazine.

The device is established in an especially simple way when the bottom of the magazine is formed as a hopper. The lower part of the hopper then forms a forming channel in which the sample is formed.

The formation of cylindrical cavities above the outlet after the ejection of a sample preventing further reproducable dispensing of samples is avoided when the pusher is arranged at an angle to the outlet and either the pusher or the housing of the magazine has a rotary actuator in order to cause a relative motion between the pusher and the magazine.

Sample material does ont adhere to the pusher or the wall of the magazine when a vibrator is arranged on the pusher and/or on the housing. At the same time, such a vibrator reliably prevents cavities from forming in the magazine and ensures that further material always slides in the direction of travel of the pusher.

In order to convey the sample material within the magazine towards the outlet, the pusher is, in addition to its longitudinal mobility, capable of rotating around its longitudinal axis and has a thread formed as a worm conveyor on its circumferential surface.

In order to enable the automatic dispensing of metered and equal samples from one device or metered and different samples of a corresponding number of such devices the magazine is adapted to be inserted into a support disc which has a plurality of such openings for the support of several magazines. Automatic handling, for example by a robot, is especially simple with such an embodiment. It is, of course, possible to provide another suitable mounting device instead of the support disc.

For automatic working, a device wherein the support disc is arranged at the upper end of a swivelling axis which is directed upwards at an angle in a mount and which is capable of rotating with determined angular amounts, the openings of the support disc being on a pitch circle which runs coaxially in relation to the swivelling axis, and wherein the openings are directed at such an angle to the outside with regard to the support disc, that the lowest opening is directed vertically, has proved to be very advantageous. The angular position of the support disc results in that the individual magazines are moved from a vertical position into an angular position by the swivel motion of the support disc. Due to this tilting motion, the sample material in the magazine loosens after the ejection of a sample. By this, a compression of the material caused by the pusher and by the vibrator is reversed, which is necessary for forming and ejecting further samples. It is a further advantage of the angular position of the support disc that there is enough room even if the diameter of the disc is relatively small, to provide, for example, a balance that can be charged from above beneath the lowest magazine which is in a vertical position.

It is easy to move the pusher of the magazine that is in the lowest position, if according to an advantageous embodiment of the invention, a ram being vertically movable in predetermined steps is provided in line with the lowest opening on a stationary arm projecting over the support disc, this ram having a coupling at its lowest end that will couple with the pusher of the magazine that is in the lowest position.

The ram could be connected with the respective pusher, for example by an electromagnetic coupling. A coupling works especially reliably, when it is provided with a t-shaped groove at the lowest end of the ram and when the pushers of the magazines each have a disc at their upper end that can move into the t-shaped groove.

It is easy to prevent that a formed sample body being ejected by the pusher adhereing at the magazine if the vibrator is formed as a finger in the lower part of the mount, this finger making contact with the lowest magazine near its outlet. At the same time, such a vibrator prevents reliably cavities forming in the magazine and ensures that further material always slides into the travel direction of the pusher.

Contact with the magazines along the front edge of the finger and thus undesired frictional forces can be prevented when the finger is arranged to be retractable.

The support disc can be indexed in different manners. The construction of the device is very easy and its handling is very advantageous when the swivelling axis of the support disc is driven by means of a worm and a worm wheel which is arranged on the swivelling axis and when for positioning the support disc two indexing discs are provided, whereby one indexing disc rotates together with the worm and one indexing disc rotates together with the support disc.

The vertical mobility of the ram can easily be accomplished when the ram is vertically movable by means of a spindle that is driven by an electric motor and that has a nut arranged on the spindle in such a manner that it cannot rotate, and when an indexing disc controlled by a sensor is arranged on the shaft of the electric motor.

BRIEF DESCRIPTION OF THE DRAWINGS

The invention allows numerous embodiments. In order to clarify its basic principle, some of the embodiments are shown in the drawing and described below. The drawing shows in.

DESCRIPTION OF PREFERRED EMBODIMENTS

Figure 1:
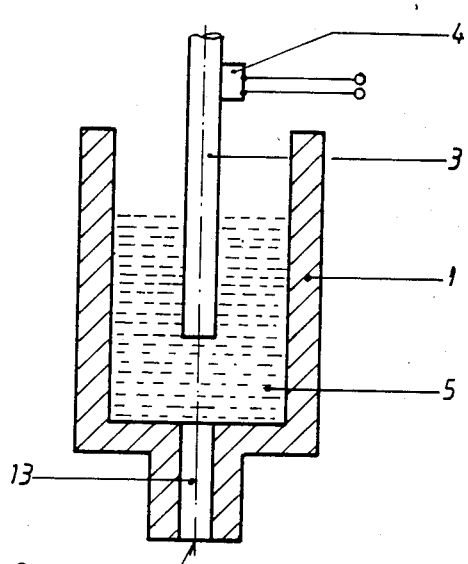
FIG. 1 a longitudinal sectional through a first embodiment according to the invention, FIG. 2 a longitudinal sectional through a second embodiment according to the invention, FIG. 3 a longitudinal sectional through a third embodiment according to the invention, FIG. 4 a side view partly drawn in section of a complete device having several magazines, FIG. 5 a top plan view of the device according to FIG. 4.

FIG. 1 shows a magazine 1 formed as a pipette for solids and having an outlet 2 at its base. This outlet 2 is at the end of a forming channel 13 and has, just as the forming channel 13, a very small diameter of about 0,5 to 1 mm. A pusher 3 projects from above into the magazine 1, which can be closed at its upper side in a manner that is not shown. The pusher 3 is arranged coaxially in relation to the outlet 2 and axially movable in relation to the forming channel 13. A vibrator 4 can be arranged on the pusher 3. Pulverized sample material 5 is filled into the magazine 1.

If a small quantity of sample material is to be dispensed through the outlet 2, the pusher 3 is moved into the magazine 1. By this, the sample material 5 below the pusher 3 is compressed and a small quantity is pressed into the forming channel 13 and then ejected through the outlet 2. This quantity can be metered and kept sufficiently constant by determining the stroke length of the pusher 3. The pusher 3 is capable of being moved down to the outside of the outlet 2.

Figure 2:
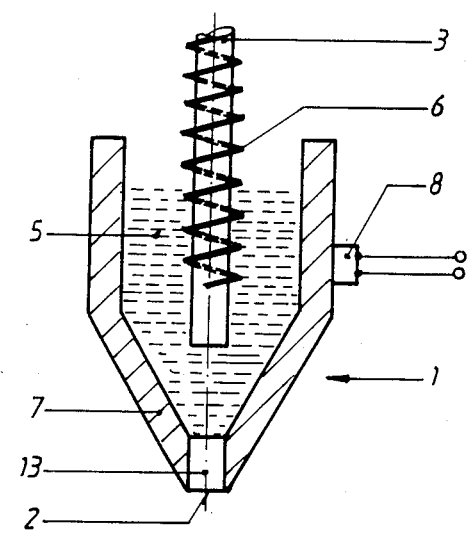

The embodiment according to FIG. 2 has a thread 6 on the outside of the pusher 3. The thread forms a worm conveyor on the circumferential surface of the pusher. This results in the sample material 5 being conveyed towards the forming channel 13 by rotation of the pusher 3 around its longitudinal axis. Furthermore, the embodiment according to FIG. 2 differs from the embodiment according to FIG. 1 in that the magazine 1 has a hopper 7 that narrows towards the outlet 2, the lower part of the hopper 7 working as a forming channel. Additionally, a vibrator 8 on the exterior wall of the magazine 1 is shown, ensuring that the sample material 5 always slides downwards.

Figure 3:
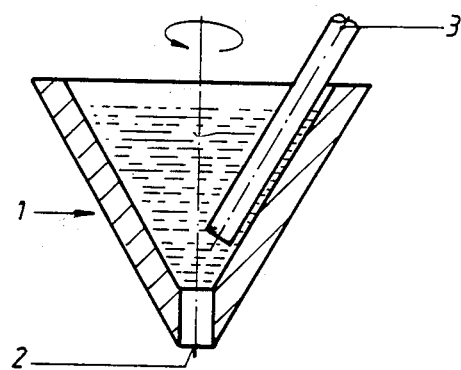

In the embodiment according to FIG. 3, the pusher 3 is at an angle to the longitudinal axis of the magazine 1. The dispensing of sample material 5 is also carried out by moving the pusher 3 into the magazine 1. Each time a sample has been dispensed, the magazine 1 is slightly rotated in relation to the pusher 3. This prevents cavity formation in the sample material 5.

Figure 4:
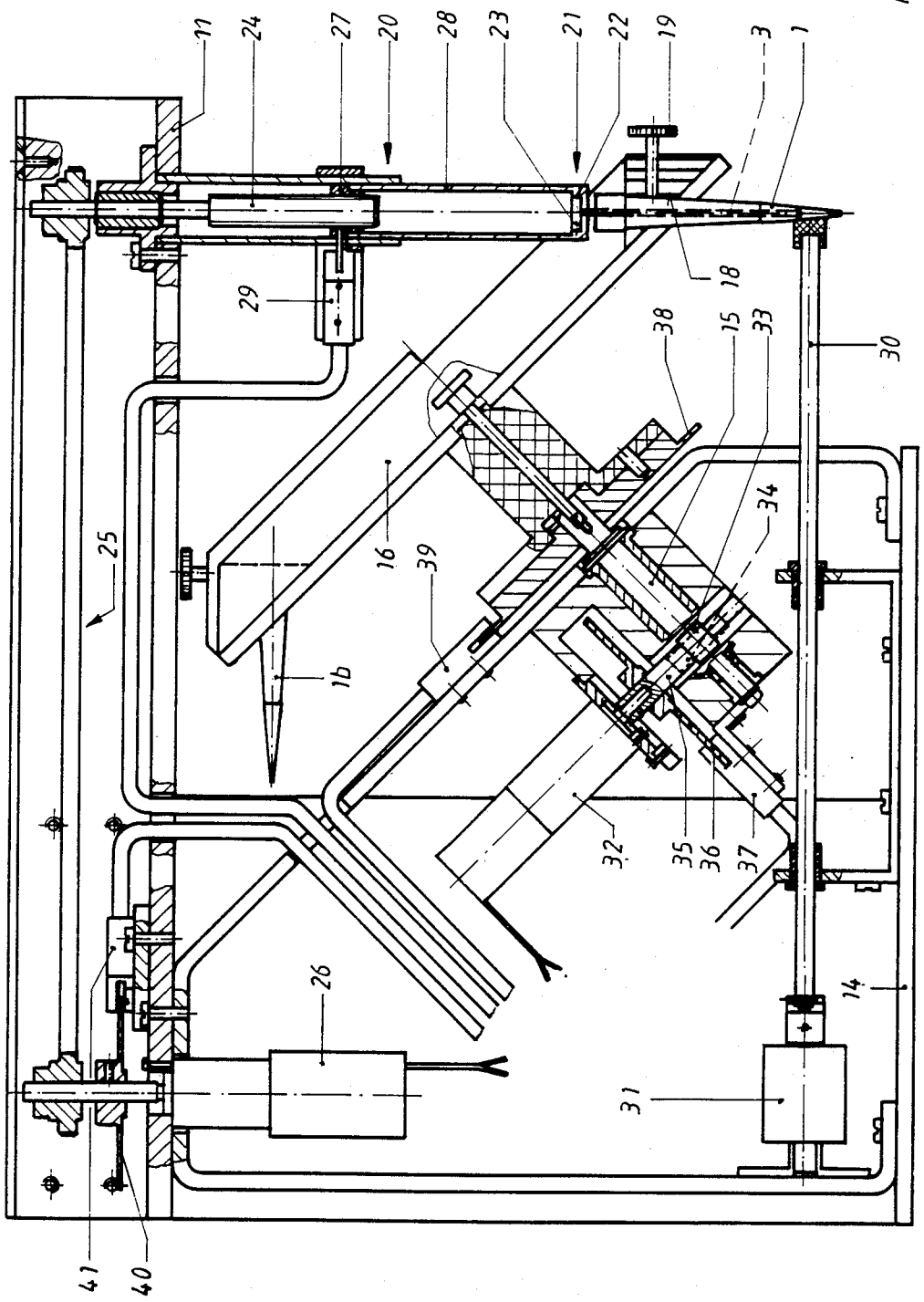

In the device as shown in FIG. 4, a swivelling axis 15 pointing upwards at an angle of 45 degrees is arranged in a mount 14, the swivelling axis 15 being capable of rotating by determined angular amounts. A support disc 16 is fixed on the swivelling axis 15 in such a manner that it rotates with the swivelling axis 15. The support disc 16 houses several magazines at regular distances on a pitch circle 17 shown in FIG. 5. Three of these magazines have the reference numbers 1c, 1d, 1e in FIG. 5 and two magazines with the reference numbers 1, 1b are shown in FIG. 4.

In FIG. 4 the magazine 1 shows as an example that the magazines are each inserted into an opening 18 and clamped by a clamping screw 19 which is directed at right angles to the opening 18. It is of importance that the openings 18 in the support disc 16 are directed outwards at an angle of 45 degrees corresponding to the angular position of the swivelling axis 15. By this, the lowest magazine 1 is in a vertical position, in which it is in line with the ram 20 being arranged vertically movable on an arm 11 of the mount 14. This ram 20 has at its lower end a coupling 21 in the form of a t-shaped groove 22, into which a disc 23 that is arranged at the upper end of each pusher 3 of each magazine 1 grips.

The ram 20 can be moved by an electric motor, in order to move the pusher 3 in the lowest magazine 1 upwards or downwards. A spingle 24 being arranged coaxially in the ram 20 is driven by an electric motor 26 via a belt drive 25 in order to cause the stroke motion of the ram 20. A nut 27 is placed on the spindle 24. This nut 27 is connected firmly to an end of the ram 20 where the coupling 21 is guided so that it may not rotate. Thus, this end 28 of the ram moves upwards or downwards when the spindle 24 rotates, A common sensor 29 is used to signal the initial position of the end 28 of the ram.

Furthermore, FIG. 4 shows a finger 30 provided in the lower part of the mount 14, the frontmost end of this finger 30 making contact with the lower end of the magazine 1. The finger 30 is connected at its rear end with a vibration generator 31 and is retractable.

An electric motor 32 serves to drive the support disc 16, this electric motor 32 driving a worm wheel 34 via a worm 33. The worm wheel 34 is arranged on the swivelling axis 15 in such a way that it can rotate. An indexing disc 36 is placed on the shaft 35 which drives the worm 33. When indexing the support disc 16, the rotation of the indexing disc 36 is monitored by an optical sensor 37. A similar indexing disc 38 is fixed on the swivelling axis 15 and is monitored by a sensor 39 in order to monitor the initial position of the ram 20.

The stroke of the ram 20 is determined by the rotations of the electric motor 26. For this purpose, an indexing disc 40 is provided on the shaft of the electric motor 26. The rotations of this indexing disc 40 are monitored by a sensor 41 which ensures vertical positioning of the ram 20 in a predetermined manner.

Figure 5:
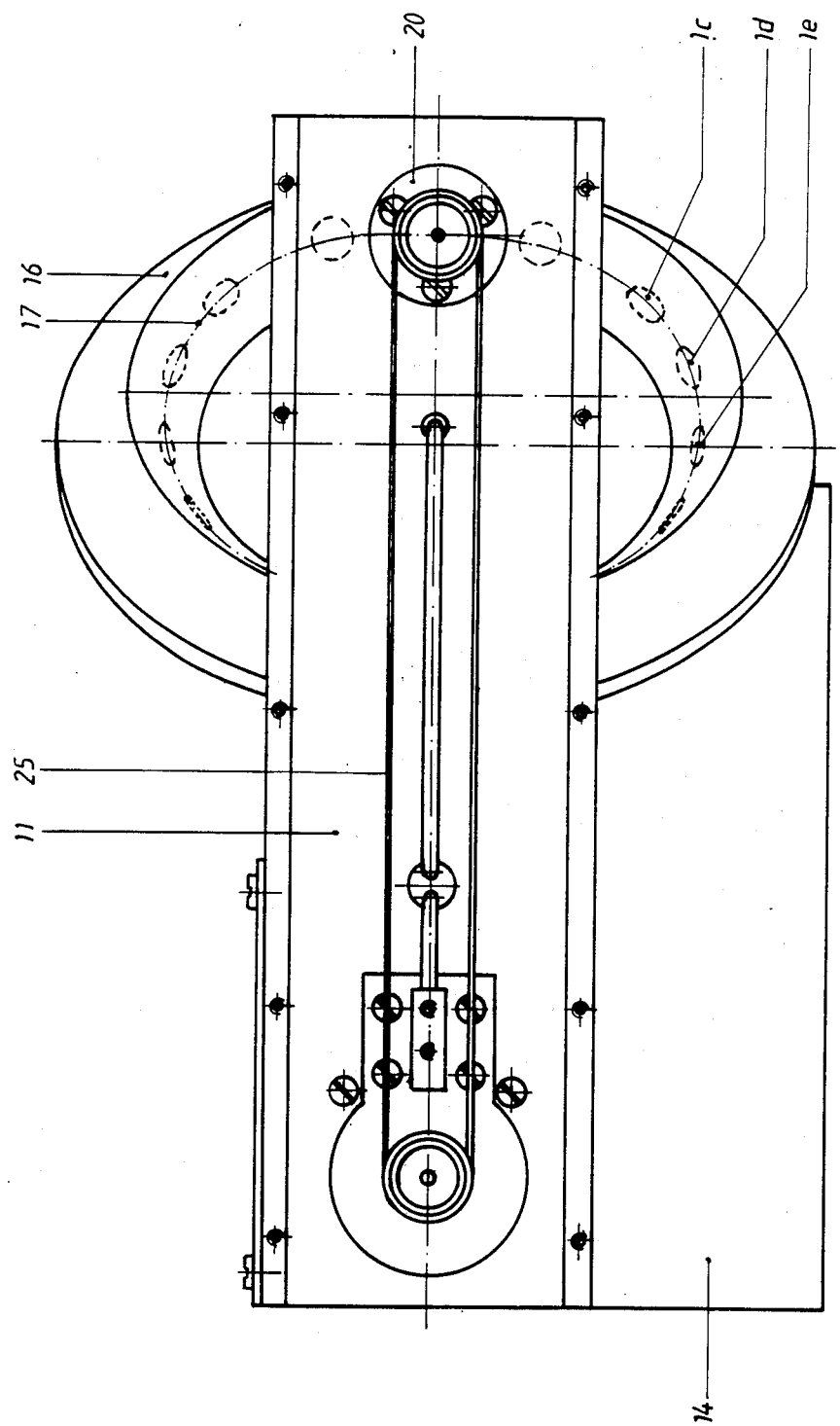

FIG. 5 shows a top view of the support disc 16. Furthermore, the drive of the ram 20 via the belt drive 25 can be clearly seen.

What is claimed is:

1. A microgram or milligram sample dispensing device capable of dispensing a powder or paste comprising:
   (a) a plurality of magazines wherein each magazine has a base,
   (b) an unobstructed outlet at the base of dispensing the powder or paste, and
   (c) a pusher arranged to be movable towards the outlet, wherein the pusher is capable of forming, separating and ejecting a predetermined quantity of the microgram of milligram sample, and
   (d) a support disc having a plurality of openings, wherein each of the openings supports each magazine, and each magazine includes a pusher.

2. A device according to claim 1, wherein the pusher is arranged to be moved down to the outside of the outlet.

3. A device according to claim 1, wherein the outlet is provided at the end of a forming channel which is in alignment with the pusher and forms a part of the magazine.

4. A device according to claim 1, wherein the base of the magazine is formed as a hopper.

5. A device according to claim 1, wherein the pusher is arranged at an angle relative to the outlet and either the pusher or the housing of the magazine has a rotary actuator in order to cause a relative motion between the pusher and the magazine.

6. A device according to claim 1, wherein a vibrator is arranged on the pusher and/or on the housing of the magazine.

7. A device according to claim 1, wherein the pusher has a circumferential surface, is arranged for longitudinal mobility, is capable of rotating around a longitudinal axis and has a thread formed as a worm conveyor on its circumferential surface.

8. A device according to claim 1, including:
   (a) a swivelling axis wherein the support disc is connected to an upper end of the swivelling axis.
   (b) a mount, wherein the swivelling axis is directed upwards and at an angle from the mount, and
   (c) means for rotating the swivelling axis such that the openings of the support disc are on a pitch circle which is coaxial with the swivelling axis and wherein at least one of the openings of the support disc is capable of being directed vertically.

9. A device according to claim 8, including:
   (a) a ram vertically aligned with at least one of the openings of the support disc,
   (b) a stationary arm projecting over the support disc for supporting the ram,
   (c) a coupling at an end of the ram for coupling with the pusher.

10. A device according to claim 9, wherein the coupling is provided with a t-shaped groove at the end of the ram and wherein the pushers of the magazines each have a disc at their upper end being movable into the t-shaped groove.

11. A device according to claim 8, wherein a vibrator is formed as a finger on a lower part of the mount, the finger making contact with an outlet of at least one of the magazines.

12. A device according to claim 11, wherein the finger is arranged to be retractable.

13. A device according to claim 8, including:
   (a) a worm and worm wheel for positioning the support disc, and
   (b) two indexing discs, wherein one indexing disc rotates with the worm and one indexing disc rotates with the support disc.

14. A device according to claim 8, including:
   (a) a spindle for vertically moving the ram,
   (b) an electric motor and shaft for driving the spindle,
   (c) a nut arranged to prevent the spindle from rotating,
   (d) an indexing disc arranged on the shaft, and
   (e) a sensor for determining vertical positioning of the ram.

* * * * *